US010664709B2

(12) United States Patent
You

(10) Patent No.: US 10,664,709 B2
(45) Date of Patent: May 26, 2020

(54) DRIVING ASSISTANT APPARATUS USING FRONT MONITORING APPARATUS AND DRIVING ASSISTANT METHOD USING FRONT MONITORING APPARATUS

(71) Applicant: MANDO CORPORATION, Gyeonggi-do (KR)

(72) Inventor: Kwan Sun You, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 25 days.

(21) Appl. No.: 15/719,553

(22) Filed: Sep. 29, 2017

(65) Prior Publication Data
US 2018/0101737 A1 Apr. 12, 2018

(30) Foreign Application Priority Data

Oct. 11, 2016 (KR) .................. 10-2016-0131519

(51) Int. Cl.
| *H04N 5/232* | (2006.01) |
| *G06K 9/00* | (2006.01) |
| *H04N 13/239* | (2018.01) |
| *G08G 1/16* | (2006.01) |
| *G01S 5/16* | (2006.01) |
| *H04N 13/296* | (2018.01) |
| *G08G 1/04* | (2006.01) |
| *G08G 1/052* | (2006.01) |
| *G01C 21/36* | (2006.01) |

(Continued)

(52) U.S. Cl.
CPC .......... *G06K 9/00798* (2013.01); *G01S 5/16* (2013.01); *G06K 9/00805* (2013.01); *G08G 1/04* (2013.01); *G08G 1/052* (2013.01); *G08G 1/166* (2013.01); *G08G 1/167* (2013.01);

*H04N 13/239* (2018.05); *H04N 13/296* (2018.05); *G01C 21/3629* (2013.01); *G01C 21/3632* (2013.01); *G01C 21/3667* (2013.01);
(Continued)

(58) Field of Classification Search
CPC ........... H04N 5/23296; H04N 13/0239; G06K 9/00798; G08G 1/052; G01C 21/3694
See application file for complete search history.

(56) References Cited

U.S. PATENT DOCUMENTS

| 9,120,484 B1 * | 9/2015 | Ferguson | ............. G05D 1/0214 |
| 2008/0123902 A1 * | 5/2008 | Park | .................. G06K 9/00798 |
| | | | 382/104 |

(Continued)

FOREIGN PATENT DOCUMENTS

| CN | 101369312 | 2/2009 |
| CN | 103535029 | 1/2014 |

(Continued)

OTHER PUBLICATIONS

Office Action dated Nov. 5, 2019 for Chinese Patent Application No. 201710942383.8 and its English translation by Google Translate.

Primary Examiner — Tsion B Owens
(74) Attorney, Agent, or Firm — Ladas & Parry, LLP

(57) ABSTRACT

The present disclosure provides a driving assist system including: a determiner configured to determine whether a current road is an intersection on the basis of camera information obtained from a stereo camera for monitoring the front area of a vehicle; and an adjuster configured to adjust the direction of a first field of view (FOV) or a second field of view such that the overlap area of the first field of view and the second field of view that are the fields of view of a first camera and a second camera included in the stereo camera is reduced, when the current road is determined as an intersection.

18 Claims, 13 Drawing Sheets

(51) Int. Cl.
  *G01S 13/86* (2006.01)
  *G01S 13/931* (2020.01)
  *G01S 19/42* (2010.01)

(52) U.S. Cl.
  CPC ..... *G01C 21/3694* (2013.01); *G01C 21/3697* (2013.01); *G01S 13/867* (2013.01); *G01S 13/931* (2013.01); *G01S 19/42* (2013.01); *H04N 5/23296* (2013.01); *H04N 5/23299* (2018.08)

(56) References Cited

U.S. PATENT DOCUMENTS

| | | | | |
|---|---|---|---|---|
| 2008/0162027 | A1* | 7/2008 | Murphy | B60W 50/14 |
| | | | | 701/117 |
| 2013/0253754 | A1* | 9/2013 | Ferguson | G05D 1/0231 |
| | | | | 701/28 |
| 2016/0205384 | A1 | 7/2016 | Sekiguchi et al. | |
| 2016/0342850 | A1* | 11/2016 | Elimalech | G08G 1/161 |
| 2017/0113683 | A1* | 4/2017 | Mudalige | B60W 30/08 |
| 2017/0293199 | A1* | 10/2017 | Kim | H04N 13/239 |
| 2018/0052457 | A1* | 2/2018 | Kim | H04N 13/128 |
| 2018/0326982 | A1* | 11/2018 | Paris | B60W 30/0956 |
| 2019/0012912 | A1* | 1/2019 | Kim | G08G 1/096783 |

FOREIGN PATENT DOCUMENTS

| | | |
|---|---|---|
| CN | 203958002 | 11/2014 |
| CN | 105459907 | 4/2016 |
| CN | 105612567 | 5/2016 |
| CN | 105827904 | 8/2016 |

\* cited by examiner

DRIVING ASSISTANT APPARATUS USING FRONT MONITORING APPARATUS AND DRIVING ASSISTANT METHOD USING FRONT MONITORING APPARATUS

CROSS REFERENCE TO RELATED APPLICATION

This application claims priority from Korean Patent Application No. 10-2016-0131519, filed on Oct. 11, 2016, which is hereby incorporated by reference for all purposes as if fully set forth herein.

BACKGROUND OF THE INVENTION

1. Field of the Invention

The present disclosure relates a forward monitoring system for a vehicle and a driving assist system using the forward monitoring system.

2. Description of the Prior Art

In general, a driving assist system assists a driver who is driving a vehicle that is controlled by the driver.

A common driving assist system prevents a collision with an external object by appropriately controlling the speed of a vehicle and other systems including a steering system and a brake system in accordance with a detected external environment, thereby providing not only convenience for a driver, but also safety from an accident.

For example, a driving assist system performs SCC (Smart Cruise Control) that detects a forward vehicle and controls the subject vehicle to be driven a predetermined distance from the forward vehicle, and AEB (Automatic Emergency Brake) that controls the subject vehicle to prevent a collision with objects therearound, including the forward area, by detection the objects.

The driving assist system necessarily requires detection devices such as a camera and a radar that can accurately detect the external environment in order to perform these functions.

Accordingly, the driving assist system uses, as detection devices, a stereo camera that can three-dimensionally detect objects rather than common cameras, and other sensors including a radar, thereby accurately detecting the external environment.

Meanwhile, common stereo cameras have a limited field of view of about 45 degrees. Accordingly, when stereo cameras are used, there is a limit that only objects within 45 degrees can be detected. Further, other vehicles that transversely move at high speeds are not detected in some cases due to the limited field of view.

SUMMARY OF THE INVENTION

Accordingly, an aspect of the present disclosure is to provide a forward monitoring system that detects the front area using a stereo camera and can have a field of view of 45 degrees or more at an intersection where there may be another vehicle transversely moving, and a driving assist technology using the forward monitoring system.

In accordance with an aspect of the present disclosure, there is provided a driving assist system including a forward monitoring system, the driving assist system including: a determiner configured to determine whether a current road is an intersection on the basis of camera information obtained from a stereo camera for monitoring the front area of a vehicle; and an adjuster configured to adjust the direction of a first field of view (FOV) or a second field of view such that the overlap area of the first field of view and the second field of view that are the fields of view of a first camera and a second camera included in the stereo camera is reduced, when the current road is determined as an intersection.

In accordance with another aspect of the present disclosure, there is provided a driving assist method including: determining whether a current road is an intersection on the basis of camera information obtained from a stereo camera for monitoring the front area of a vehicle; and adjusting the direction of a first field of view (FOV) or a second field of view such that the overlap area of the first field of view and the second field of view that are the fields of view of a first camera and a second camera included in the stereo camera is reduced, when the current road is determined as an intersection.

According to the present disclosure described above, it is possible to provide a forward monitoring system that can monitor the front area using a stereo camera and can have a field of view of over 45 degrees at an intersection, and a driving assist system using the forward monitoring system.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
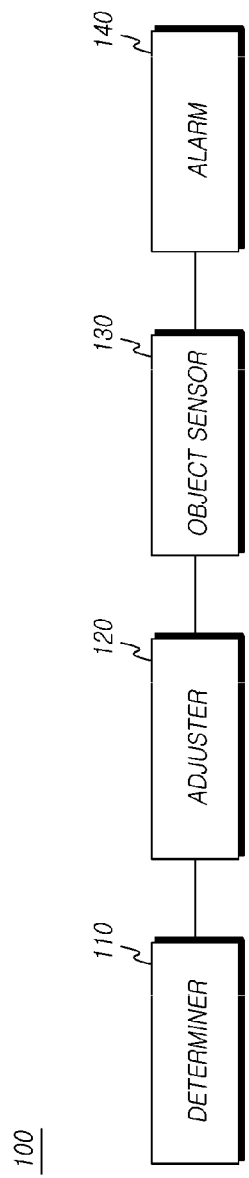
FIG. 1 is a diagram showing the configuration of a driving assist system according to an embodiment.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram showing the configuration of a driving assist system according to an embodiment.

Referring to FIG. 1, a driving assist system 100 according to an embodiment may include a forward monitoring system that includes: a determiner 110 that determines whether the current road is an intersection on the basis of route guidance information obtained from a route guidance device such as a navigation device or camera information obtained from a stereo camera that detects the front area of a vehicle; and an adjuster 120 that adjusts the direction of a first field of view (FOV) or a second field of view such that the overlap area of the first field of view and the second field of view that are the fields of view of a first camera and a second camera included in the stereo camera is reduced, when the current road is determined as an intersection.

The driving assist system of this embodiment may further include: in addition to the forward monitoring system, an object sensor 130 that detects objects in the front area by fusing radar information obtained from a radar that monitors the front area of a vehicle and camera information; and an alarm 140 that gives notice that there is an object in the front area or gives a warning of a danger of collision with an object in the front area.

A navigation device that is a route guidance device can perform largely the following four functions.

A navigation device can self-locate. That is, the navigation device can find the current location of a vehicle using a GPS (Global Positioning System) and the found location can be used as basic data for calculating the route.

The navigation device can transmit the location. Accordingly, it is possible to transmit the current location of a vehicle using the navigation device when there is a need for an emergency service due to malfunction of a vehicle or a rescue due to an accident. Further, it is possible to locate the vehicle using the location transmitted from the navigation device when the vehicle is stolen.

Further, the navigation device can calculate the optimal route to the destination in consideration of the traffic situation. For example, when a driver inputs a destination through operation parts or a voice, the navigation device can find the subject current location and calculate the optimal route to the destination on the basis of the found current location and data in a map memory. In this process, real-time traffic information collected through various information communication systems including a TIM (Traffic Information System) and an RDS (Radio Data System) or the internet can be considered in calculating the distance to the destination. The real-time traffic information may include a congested zone, a construction zone, a closed road etc.

Finally, the navigation device can provide route guidance for driving to the destination along the calculated optimal route. In general, the navigation device provides the route guidance using voice and shows the current location with an arrow on a road map display. Further, the navigation device immediately calculates an alternate route and provides guidance when the vehicle departures from the set route. Further, the navigation device can provide not only the road information, but also various items of information including a speed limit.

Accordingly, the determiner 110 according to an embodiment can determine whether the current road is an intersection on the basis of the location information of the vehicle obtained from the navigation device and the location information of intersections in the map memory.

The stereo camera is a special camera that obtains two images of an object using two camera lenses spaced at a predetermined distance from each other, so it is possible to see a three-dimensional image from the two images using a stereo viewer. The stereo viewer may be a positive film taken by a stereo camera or a stereo adaptor and a three-dimensional image can be provided by the parallax due to the gap between the two camera lenses. The two camera lenses can each operate as a camera.

Accordingly, the determiner 110 according to an embodiment can determine whether the current road is an intersection by detection the characteristics of known intersection from the camera information obtained from the stereo camera. The characteristics of intersections may include at least one of a vehicle that is transversely running, a plurality of crosswalks, and a transverse lane.

When the current road is determined as an intersection, the adjuster 120 according to an embodiment can adjust the direction of a first field of view (FOV) or a second field of view such that the overlap area of the first field of view and the second field of view that are respectively the fields of view of the first camera and the second camera included in the stereo camera is reduced.

For example, when the determiner 110 determines that the current road is an intersection having a straight lane and a right turn lane, the adjuster 120 can adjust right the direction of the field of view of the camera positioned closer to the right turn lane of the first camera and the second camera.

Alternatively, when the determiner 110 determines that the current road is an intersection having a straight lane and a left turn lane, the adjuster 120 can adjust left the field of view of the camera positioned closer to the left turn lane of the first camera and the second camera.

Alternatively, when the determiner 110 determines that the current road is an intersection having a straight lane, a left turn lane, and a right turn lane, the adjuster 120 can adjust left and right respectively the directions of the fields of view of the cameras positioned closer to the left turn lane and the right turn lane of the first camera and the second camera.

After the direction of the first field of view or the second field of view is adjusted, as described above, when the determiner 110 determines that the current road is not an intersection, the adjuster 120 can return the adjusted direction of the first field of view or the second field of view into the initial state.

In detail, before the vehicle passes an intersection, the determiner 110 determines that the current road on which the vehicle is running is an intersection and the adjuster 120 can adjust the direction of the first field of view or the second field of view. Thereafter, when time passes and the vehicle passes intersection, the determiner 110 determines that the current road on which the vehicle is running is not an intersection and the adjuster 120 can return the adjusted direction of the first field of view or the second field of view into the initial state.

Similarly, when a passing time passes after the direction of the first field of view or the second field of view is adjusted, the adjuster 120 can return the adjusted direction of the first field of view or the second field of view into the initial state. The passing time can be calculated on the basis of the average distance of intersections and the speed of the vehicle. Accordingly, a speed sensor for detecting the speed of the vehicle may be further included. Alternatively, the passing time may be calculated on the basis of the number of lanes of the current road and the speed of the vehicle. Accordingly, a lane sensor for detecting the number of lanes of the current road and a speed sensor for detecting the speed of the vehicle may be further included.

In order for the adjuster 120 to adjust the direction of the first field of view or the second field of view, as described above, it is possible to change the mechanical position of the first camera or the second camera included in the stereo camera or the position of the lens of the first camera or the lens of the second camera.

The object detector 130 according to an embodiment can detect an object in the front area by fusing camera information obtained from the stereo camera that is controlled by the adjuster 120 and radar information obtained from a radar for monitoring the front area of the vehicle.

The camera information is image information, but the radar information may be figure information. Accordingly, by fusing the camera information and the radar information that are different in essence, it is possible to accurately detect an object.

When the object sensor 130 detects an object in the front area, the alarm 140 according to an embodiment can give notice of the object in the front area or give a warning of a danger of a collision with the object in the front area.

For example, the alarm 140 can use a lamp, etc. to visually notify passengers. In order to give notice of an object in the front area, the alarm 140 may provide light having low intensity by controlling a lamp or light slowly blinking by turning on/off a lamp. On the other hand, in order to give notice of a danger of a collision with an object in the front area, the alarm 140 may provide light having high intensity by controlling a lamp or light quickly blinking by turning on/off a lamp.

Alternatively, the alarm 140 may use a sound system, etc. to aurally notify passengers. Accordingly, in order to give notice of an object in the front area, the alarm 140 may provide a small sound by controlling a sound system or a sound that is slowly repeated by turning on/off a sound system. On the other hand, in order to give notice of a danger of a collision with an object in the front area, the alarm 140 may provide a loud sound by controlling a sound system or a sound that is frequently repeated by turning on/off a sound system.

Alternatively, the alarm 140 may use a vibration system, etc. to tactually notify passengers. Accordingly, in order to give notice of an object in the front area, the alarm 140 may provide small vibration by controlling a vibration system or vibration that is not frequently repeated by turning on/off a vibration system. On the other hand, in order to give notice of a danger of a collision with an object in the front area, the alarm 140 may provide large vibration by controlling a vibration system or vibration that is frequently repeated by turning on/off a vibration system.

The driving assist system 100 that operates, as described above, in accordance with an embodiment monitors a wide area when the vehicle passes an intersection, whereby it can detect a vehicle approaching in a right turn lane or a left turn lane. Accordingly, common stereo cameras have fields of view of about 45 degrees, but the stereo camera used in the driving assist system according to an embodiment may have a field of view of over 45 degrees, depending on adjustment.

Accordingly, the driving assist system 100 according to an embodiment lets a driver know that there is a vehicle approaching in a right turn lane or a left turn lane or gives a warning of a danger of a collision with the vehicle, whereby it is possible to prevent a possible collision accident with the vehicle.

The operation of the driving assist system according to an embodiment described above is described hereafter in detail with reference to FIGS. 2 to 10.

Figure 2:
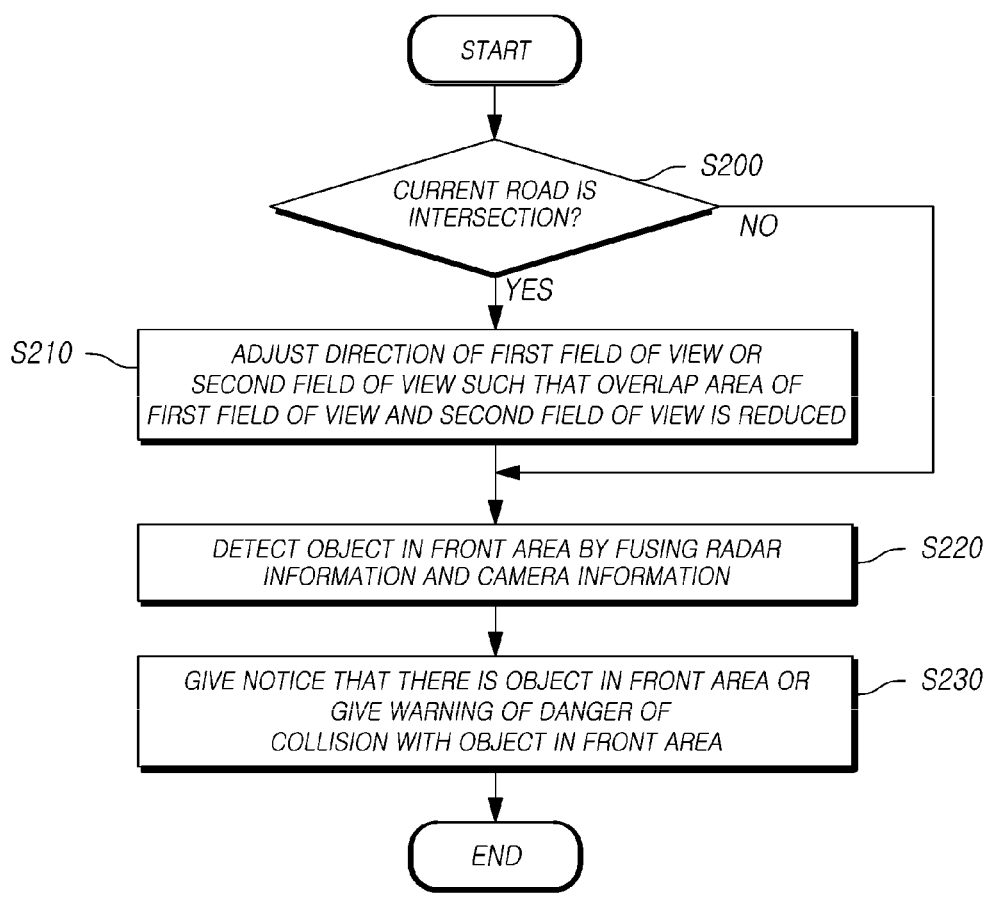
FIG. 2 is a diagram showing an example for explaining the operation of the driving assist system according to an embodiment.

FIG. 2 is a diagram showing an example for explaining the operation of the driving assist system according to an embodiment.

Referring to FIG. 2, the determiner according to an embodiment can determine whether the current road is an intersection on the basis of information obtained from the route guidance device or camera information obtained from the stereo camera that monitors the front area of a vehicle (S200).

The information from the route guidance device may include a map memory having data such as the location information of the vehicle, the location information of an intersection. Accordingly, the determiner can determine whether the current road is an intersection by comparing the location information of the vehicle and the location information of an intersection.

The camera information may be image information about the current road. Accordingly, the determiner can determine whether the current road is an intersection by detecting the characteristics of known intersections from the image information. The characteristics of intersections may include at least one of a vehicle that is transversely running, a plurality of crosswalks, and a transverse lane.

Figure 3:
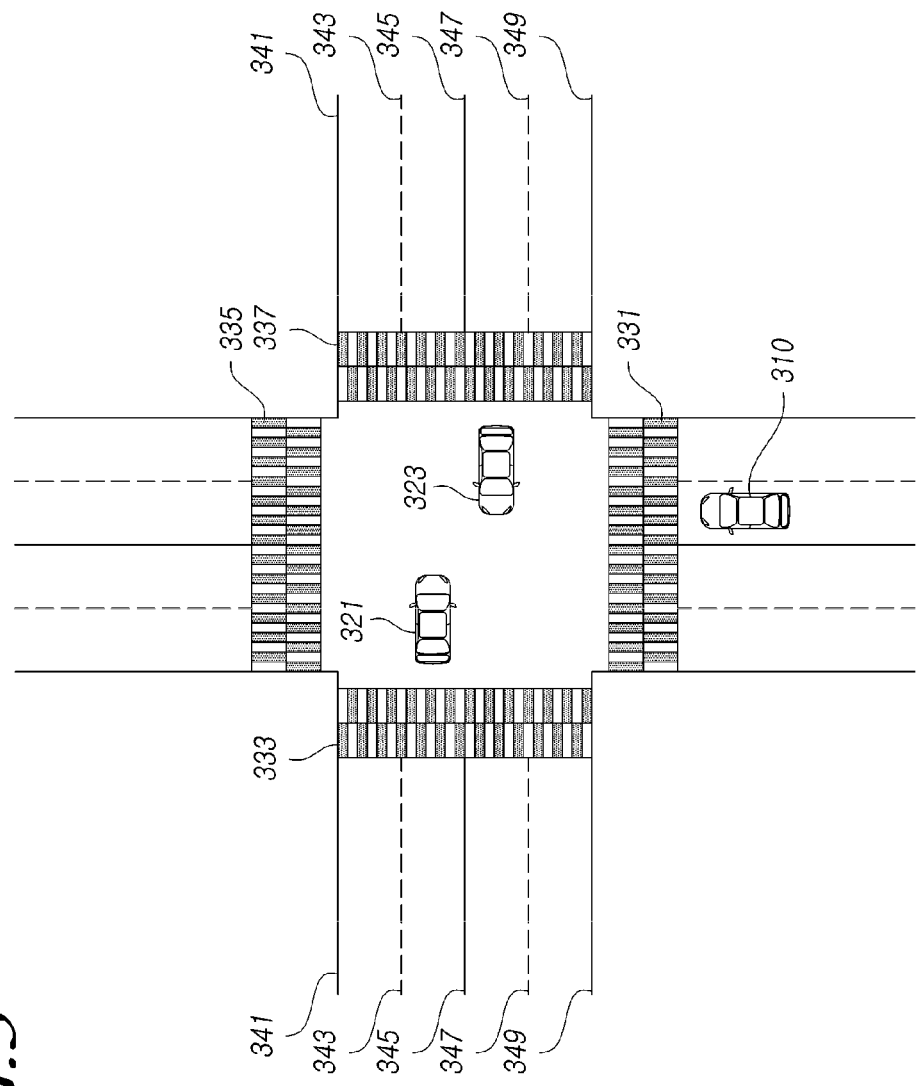
FIG. 3 is a diagram showing an example for explaining the operation of a determiner according to an embodiment.

This operation is described in detail with reference to FIG. 3 showing an example for explaining the operation of the determiner according to an embodiment.

Referring to FIG. 3, the determiner according to an embodiment included in a subject vehicle 310 can determine that the current road is an intersection when surrounding vehicles 321 and 323 that run transversely are detected from the camera information obtained from the stereo camera for monitoring the front area of the subject vehicle 310. The method of detecting the surrounding vehicles 321 and 323 that run transversely may be based on the characteristics of the sides of other vehicles known in advance. The characteristics of the sides of other vehicles may include the shapes of the sides of other vehicles or the shapes of two or three tires.

Alternatively, the determiner according to an embodiment included in the subject vehicle 310 can determine that the current road is an intersection when a plurality of crosswalks (at least two or more of 331, 333, 335, and 337) is detected from the camera information obtained from the stereo camera for monitoring the front area of the subject vehicle 310. The method of detecting the crosswalks 331, 333, 335, and 337 may be based on the characteristics of crosswalks known in advance. The characteristics of crosswalks may include white lines arranged with regular intervals.

Alternatively, the determiner according to an embodiment included in the subject vehicle 310 can determine that the current road is an intersection when a transverse lane (at least one of 341*a*, 341*b*, 343, 345, 347, and 349) is detected from the camera information obtained from the stereo camera for monitoring the front area of the subject vehicle 310. The method of detecting the transverse lane 341, 343, 345, 347, and 349 may be checking whether a detected lane was transversely drawn. The transverse direction may be a direction corresponding to the front area of the subject vehicle 310 in the longitudinal direction.

In step S200, when the current road is determined as an intersection (YES), the adjuster according to an embodiment can adjust the direction of a first field of view (FOV) or a second field of view such that the overlap area of the first field of view and the second field of view that are respectively the fields of view of the first camera and the second camera included in the stereo camera is reduced (S210).

Figure 4:
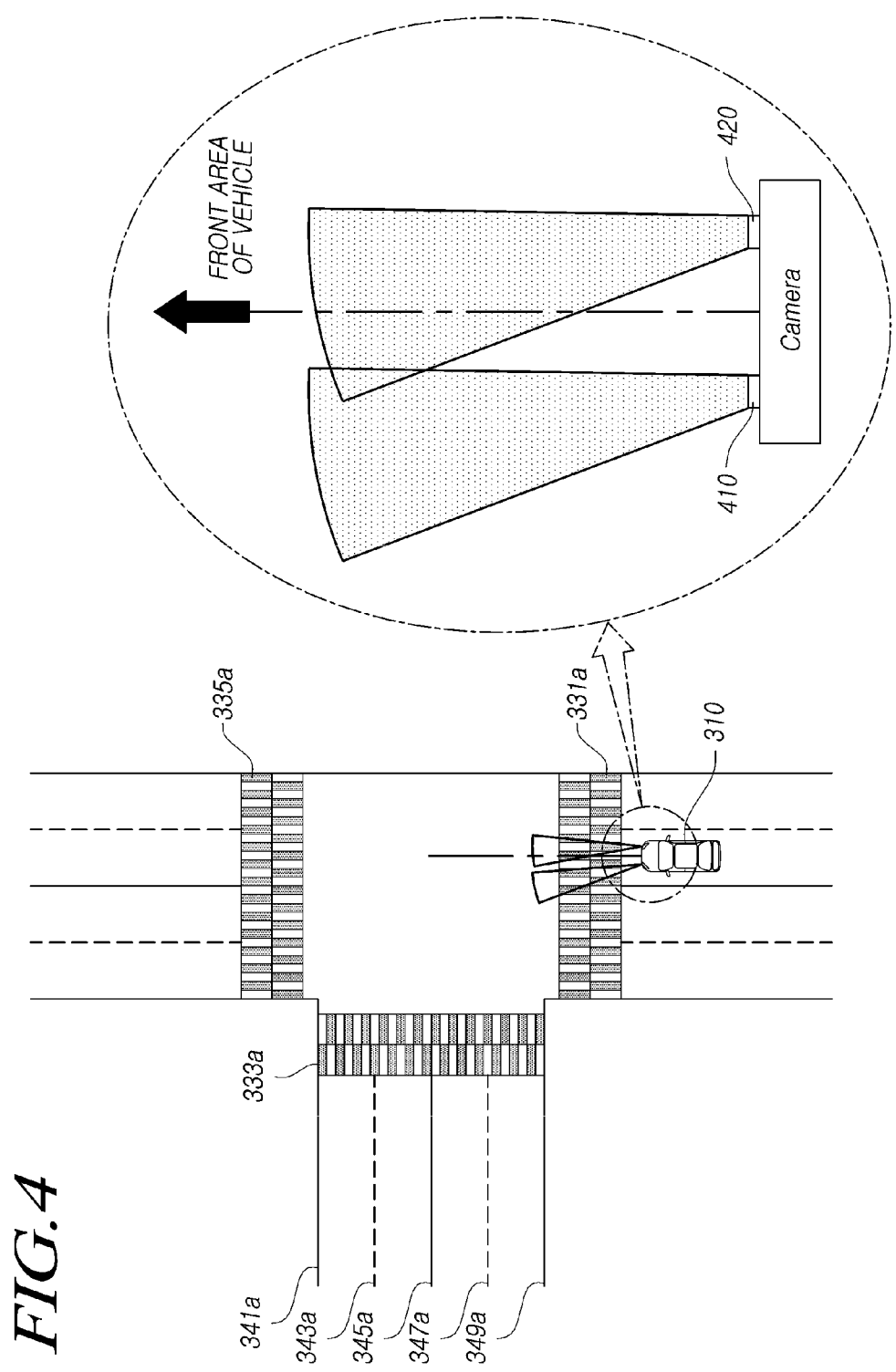
FIG. 4 is a diagram showing an example for explaining the operation of an adjuster according to an embodiment.
Figure 5:
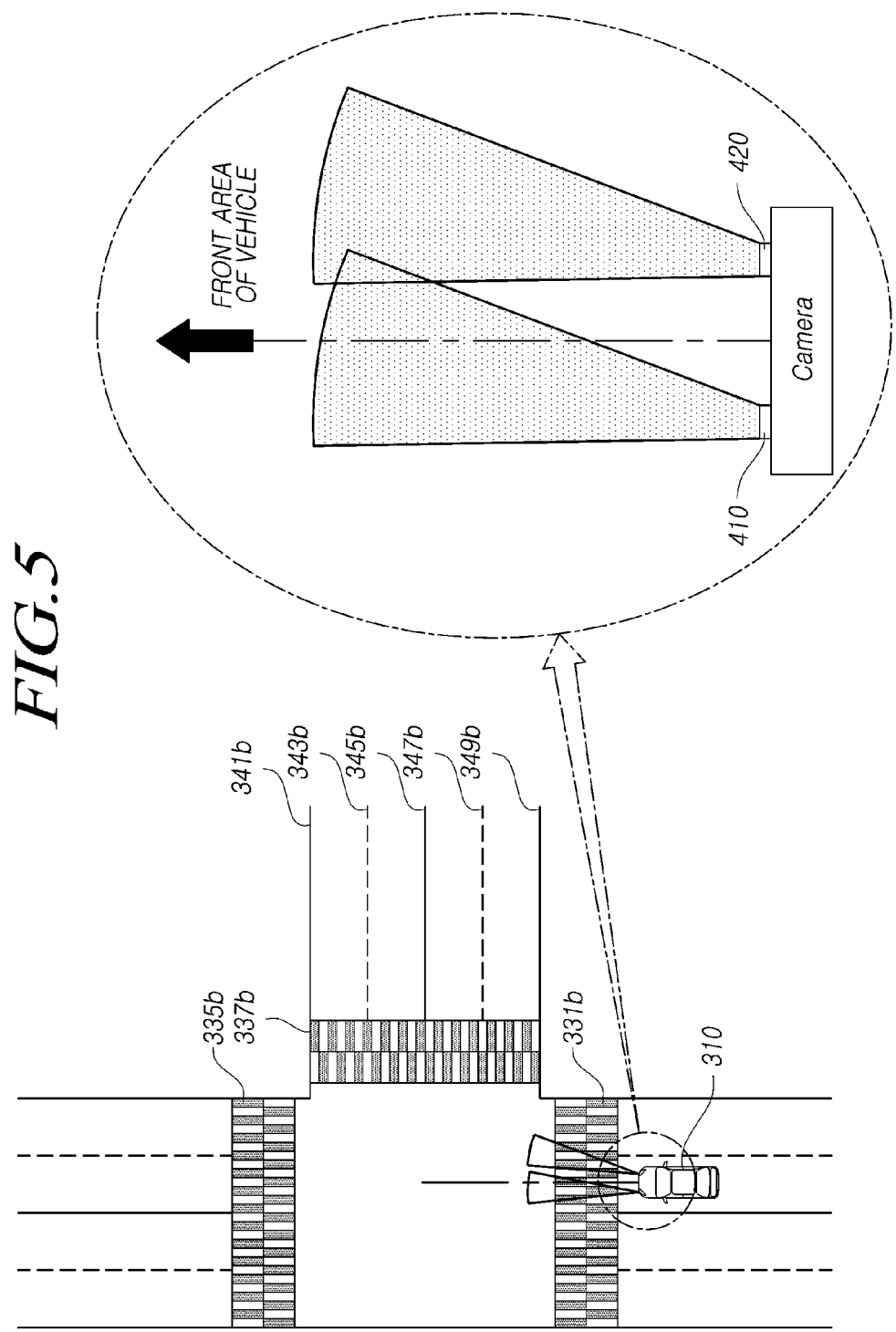
FIG. 5 is a diagram showing another example for explaining the operation of the adjuster according to an embodiment.
Figure 6:
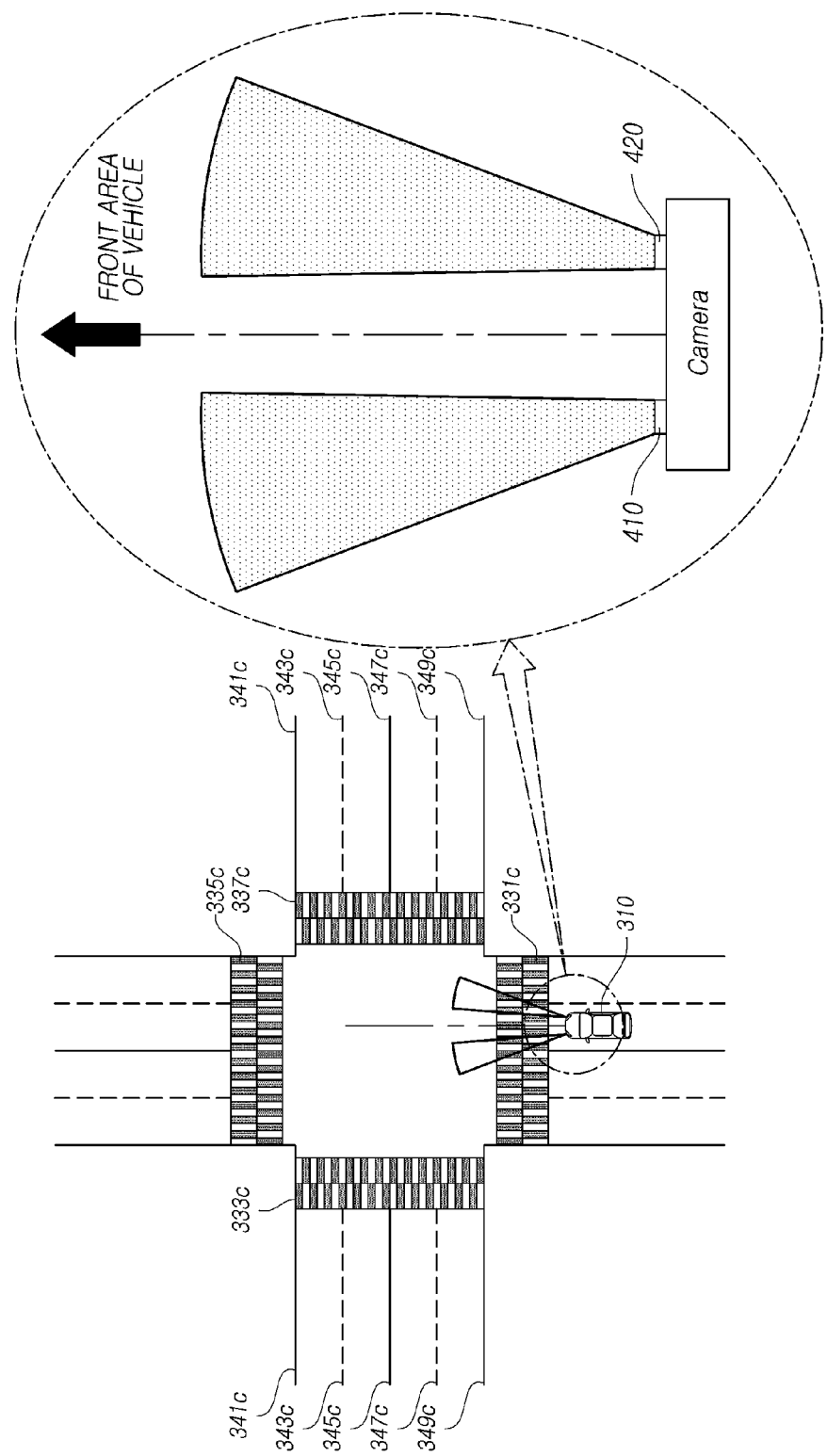
FIG. 6 is a diagram showing another example for explaining the operation of the adjuster according to an embodiment.

This operation is described in detail with reference to FIGS. 4 to 6 showing examples for explaining the operation of the adjuster according to an embodiment.

Further, this operation is described in detail with reference to FIGS. 7 to 10 showing in detail the fields of view before and after the direction of the first field of view or the second field of view is adjusted to explain the operation of the adjuster according to an embodiment.

In FIG. 4, the left one is view showing an example when a subject vehicle 310 runs on a road and the right illustration is an enlarged view showing a stereo camera that provides camera information to be used by the determiner according to an embodiment included in the subject vehicle 310.

Referring to FIG. 4, when the current road is determined as an intersection having a straight lane and a left turn lane by detecting a plurality of crosswalks 331a, 333a, and 335a or detecting transverse lanes 341a, 343a, 345a, 347a, and 349a in step S200, the adjuster can adjust left the field of view 411a of a first camera 410 that is the camera positioned closer to the left turn lane of the first camera 410 and a second camera 420. However, the field of view 421a of the second camera 420 is maintained in the initial direction of the stereo camera.

Referring to FIG. 5, when the current road is determined as an intersection having a straight lane and a right turn lane by detecting a plurality of crosswalks 331b, 335b, and 337b or detecting transverse lanes 341b, 343b, 345b, 347b, and 349b in step S200, the adjuster can adjust right the field of view 421b of the second camera 420 that is the camera positioned closer to the right turn lane. However, the field of view 411b of the first camera 410 is maintained in the initial direction of the stereo camera.

Referring to FIG. 6, when the current road is determined as an intersection having a straight lane, a left turn lane, and a right turn lane by detecting a plurality of crosswalks 331c, 333c, 335c, and 337c or detecting transverse lanes 341c, 343c, 345c, 347c, and 349c in step S200, the adjuster can adjust left the field of view 411c of the first camera 410 that is the camera positioned closer to the left turn lane and can adjust right the field of view 421c of the second camera 420 that is the camera positioned closer to the right turn lane.

As shown in FIGS. 4 to 6, according to the driving assist system of an embodiment, the stereo camera can have a wider field of view when the current road is an intersection.

Changes of fields of views of the cameras of the stereo camera according to the embodiment are described in detail with reference to FIGS. 7 to 10.

Figure 7:
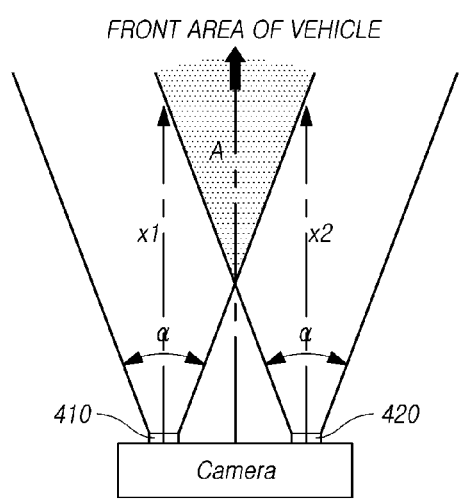
FIGS. 7 to 10 are diagrams showing an example for explaining the statuses before and after the direction of a first field of view or a second field of view is adjusted to describe the operation of the adjuster according to an embodiment.

FIG. 7 shows the directions of field of views of the stereo camera before the vehicle enters an intersection, in which the direction of the field of view of the first camera 410 at the left side is indicated by x1 and the direction of the field of view of the second camera 420 at the right side is indicated by x2, and the detection angles of the first and second cameras are indicated by α.

As shown in FIG. 7, before a vehicle enters an intersection, the direction x1 of the field of view of the first camera and the direction x2 of the field of view of the second camera are the same or symmetrically arranged with respect to at least the front area of the vehicle, and the overlap area A of the fields of view of the two cameras is relatively large.

Figure 8:
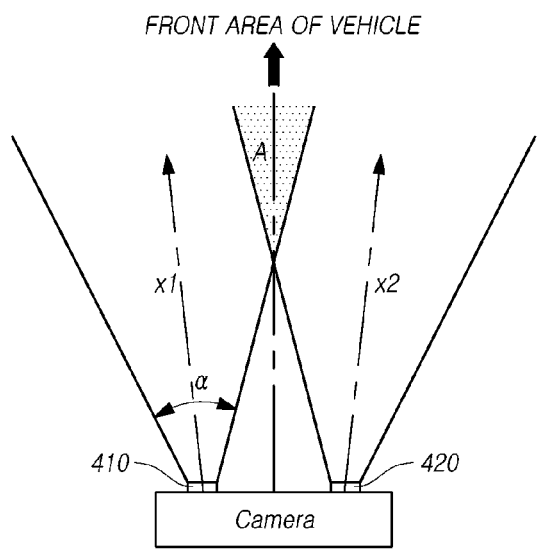

FIG. 8 shows a status when the vehicle enters an intersection having a straight lane, a left turn lane, and a right turn lane, in which the direction x1 of the field of view of the first camera is adjusted left from the front area of the vehicle and the direction x2 of the field of view of the second camera is adjusted right from the front area of the vehicle, so the overlap area A of the fields of view of the two cameras decreases, and thus, the entire transverse detection area of the stereo camera increases.

Figure 9:
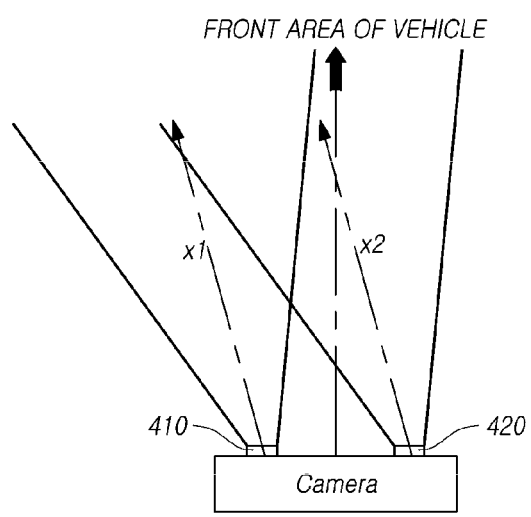

FIG. 9 shows a status when the vehicle enters a three-forked road having a straight lane and a left turn lane, in which the directions of the fields of view of both the first camera and the second camera are adjusted left from the initial positions (FIG. 7), so the left detection area of the stereo camera increases.

Figure 10:
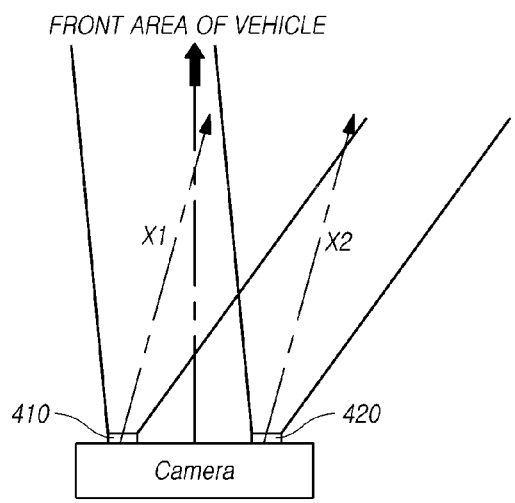

FIG. 10 shows a status when the vehicle enters a three-forked road having a straight lane and a right turn lane, in which the directions of the fields of view of both the first camera and the second camera are adjusted right from the initial positions (FIG. 7), so the right detection area of the stereo camera increases.

When the current road is determined as not being an intersection in step S200, or when the current road is determined as an intersection in step S200 and the direction of the first field of view or the second field of view is adjusted in step S210, the object sensor according to an embodiment can detect an object in the front area by fusing the radar information obtained from the radar for monitoring the front area of the vehicle and the camera information obtained from the stereo camera with the fields of view adjusted or maintained in step S210 (S220).

Detecting an object on the basis of one item of information has a problem that the accuracy is reduced when an external condition or an internal condition is added, but this problem can be solved by detection an object on the basis of a plurality of items of information. That is, step S220 may be a method for solving this problem.

Thereafter, the alarm according to an embodiment can give notice of the object in the front area detected in step S220 or give a warning of a danger of a collision with the object in the front area (S230).

For example, it is possible to use a lamp, etc. in step S230 to visually notify passengers. In order to give notice of an object in the front area, it may be possible to provide light having low intensity by controlling a lamp or light slowly blinking by turning on/off a lamp. On the other hand, in order to give notice of a danger of a collision with an object in the front area, it may be possible to provide light having high intensity by controlling a lamp or light quickly blinking by turning on/off a lamp.

Alternatively, it may be possible to use a sound system, etc. in step S230 to aurally notify passengers. Accordingly, in order to give notice of an object in the front area, it may be possible to provide a small sound by controlling a sound system or a sound that is slowly repeated by turning on/off a sound system. On the other hand, in order to give notice of a danger of a collision with an object in the front area, it may be possible to provide a loud sound by controlling a sound system or a sound that is frequently repeated by turning on/off a sound system.

Alternatively, it may be possible to use a vibration system, etc. in step S230 to tactually notify passengers. Accordingly, in order to give notice of an object in the front area, it may be possible to provide small vibration using a vibration system or vibration that is not frequently repeated by turning on/off a vibration system. On the other hand, in order to give notice of a danger of a collision with an object in the front area, it may be possible to provide large vibration by controlling a vibration system or vibration that is frequently repeated by turning on/off a vibration system.

Figure 11:
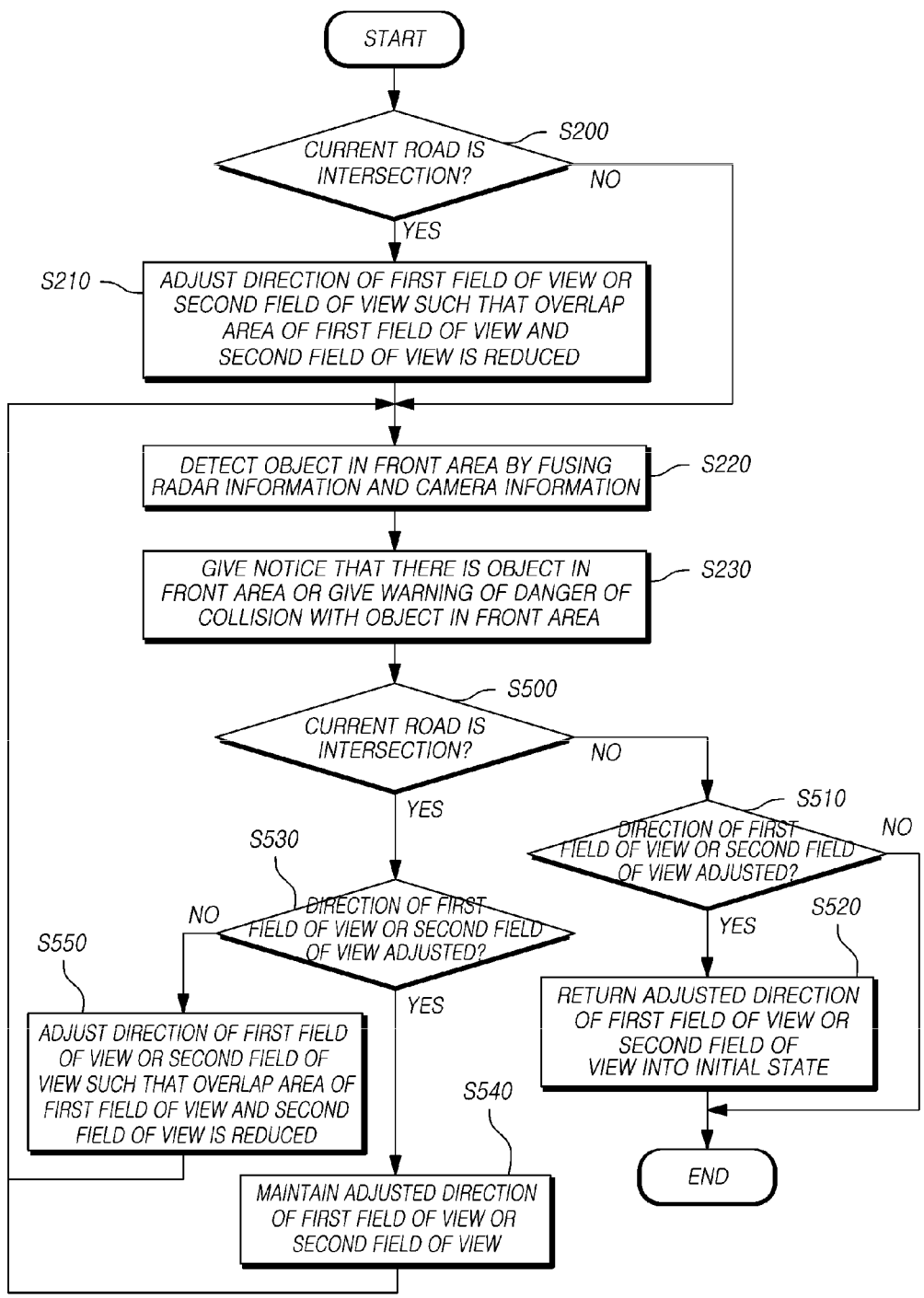
FIG. 11 is a diagram showing another example for explaining the operation of the driving assist system according to an embodiment.

FIG. 11 is a diagram showing another example for explaining the operation of the driving assist system according to an embodiment.

The adjuster according to an embodiment can return the direction of the first field of view or the second field of view that has been adjusted into the initial state when the current road is determined as not being an intersection after the direction of the first field of view or the second field of view is adjusted. To this end, the adjuster can be set to operate as in FIG. 11.

Referring to FIG. 11, the driving assist system according to an embodiment can perform steps S200 to S230 shown in FIG. 2 in a first period operation.

After the first period operation is performed, as described above, the determiner according to an embodiment can determine whether the current road is an intersection, the same as step S200 (S500).

When the current road is determined as not being an intersection (NO) in step S500, the adjuster according to an embodiment can determine whether the direction of the first field of view or the second field of view has been adjusted in the previous period operation (S510).

When it is determined that the direction of the first field of view or the second field of view has been adjusted (YES) in step S510, the adjuster can return the direction of the first field of view or the second field of view that has been adjusted in the previous period operation into the initial state (S520). That is, it is possible to return the stereo camera with the direction of the first field of view or the second field of view adjusted in the previous period operation, as shown in FIGS. 8 to 10, into the initial state as in FIG. 7.

As step S520 is performed, the stereo camera can perform the original function (obtaining a three-dimensional image) on the current road that is not an intersection.

If the current road is determined as an intersection (YES) in step S500, the adjuster can determine whether the direction of the first field of view or the second field of view has been adjusted in the previous period operation (S530).

When it is determined that the direction of the first field of view or the second field of view has been adjusted (YES) in step S530, the adjuster can maintain the direction of the first field of view or the second field of view that has been adjusted in the previous period operation (S540).

However, when it is determined that the direction of the first field of view or the second field of view has not been adjusted (NO) in step S530, the adjuster can adjust the direction of the first field of view or the second field of view such that the overlap area of the first field of view and the second field of view that are the fields of view (FOV) of the first camera and the second camera included in the stereo camera is reduced (S550).

After steps S540 and S550, steps S220, S230, and S500 to S550 can be performed as next periods.

The driving assist system according to an embodiment that operates as in FIG. 11 can actively perform the function of three-dimensionally detecting an object in the front area by adjusting the fields of view of the stereo camera that monitors a wide area at an intersection and returning the fields of view of the stereo camera into the initial state after passing the intersection.

Figure 12:
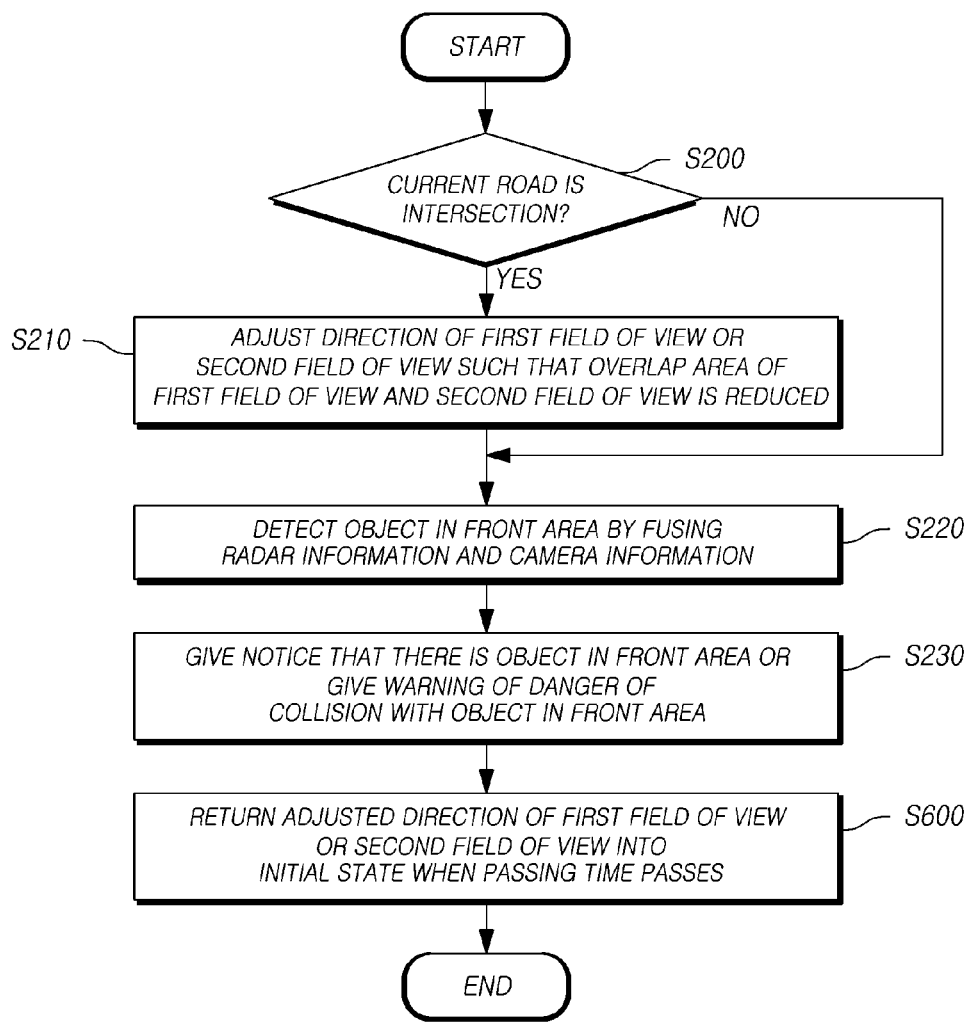
FIG. 12 is a diagram showing another example for explaining the operation of the driving assist system according to an embodiment.

FIG. 12 is a diagram showing another example for explaining the operation of the driving assist system according to an embodiment.

The adjuster according to an embodiment can return the direction of the first field of view or the second field of view that has been adjusted into the initial state when a passing time passes after the direction of the first field of view or the second field of view is adjusted. To this end, the adjuster can be set to operate as in FIG. 12.

Referring to FIG. 12, the driving assist system according to an embodiment, as shown in FIG. 2, performs steps S200 to S230, and the adjuster can return the direction of the first field of view or the second field of view that has been adjusted in step S210 into the initial state, after a passing time set for an intersection passes (S600). That is, it is possible to return the stereo camera with the direction of the first field of view or the second field of view adjusted in the previous period operation, as shown in FIGS. 8 to 10, into the initial state as in FIG. 7.

The passing time can be calculated on the basis of the average distance of intersections and the speed of the vehicle. Accordingly, a speed sensor for detecting the speed of the vehicle may be further included. Alternatively, the passing time may be calculated on the basis of the number of lanes of the current road and the speed of the vehicle. Accordingly, a lane sensor for detecting the number of lanes of the current road and a speed sensor for detecting the speed of the vehicle may be further included.

The driving assist system that operates, as described with reference to FIGS. 1 to 12, in accordance with an embodiment monitors a wide area when the vehicle passes an intersection, whereby it can detect a vehicle approaching in a right turn lane or a left turn lane. Accordingly, common stereo cameras have fields of view of about 45 degrees, but the stereo camera used in the driving assist system according to an embodiment may have a field of view of over 45 degrees, depending on adjustment.

Accordingly, the driving assist system according to an embodiment detects a vehicle approaching in a right turn lane or a left turn lane and lets the driver know there is an approaching vehicle or gives a warning of a danger of a collision with the vehicle, whereby it is possible to prevent a possible collision accident with the vehicle.

A forward monitoring system according to an embodiment including the determiner and the adjuster of the driving assist system according to an embodiment described above will be briefly described.

The forward monitoring system according to an embodiment may include: a determiner that determines whether a current road is an intersection on the basis of camera information obtained from a stereo camera for monitoring the front area of a vehicle; and an adjuster that adjusts the direction of a first field of view (FOV) or a second field of view such that the overlap area of the first field of view and the second field of view that are the fields of view of a first camera and a second camera included in the stereo camera is reduced, when the current road is determined as an intersection.

The stereo camera is a special camera that obtains two images of an object using two lenses spaced at a predetermined distance from each other, so it is possible to see a three-dimensional image from the two images using a stereo viewer. The stereo viewer may be a positive film taken by a stereo camera or a stereo adaptor and a three-dimensional image can be provided by the parallax due to the gap between the two camera lenses. The two camera lenses can each operate as a camera.

Accordingly, the determiner of the forward monitoring system according to an embodiment can determine whether the current road is an intersection by detecting the characteristics of known intersection from the camera information obtained from the stereo camera. The characteristics of intersections may include at least one of a vehicle that is transversely running, a plurality of crosswalks, and a transverse lane.

When the current road is determined as an intersection, the adjuster of the forward monitoring system according to an embodiment can adjust the direction of a first field of view (FOV) or a second field of view such that the overlap area of the first field of view and the second field of view that are respectively the fields of view of the first camera and the second camera included in the stereo camera is reduced.

For example, when the determiner determines that the current road is an intersection having a straight lane and a right turn lane, the adjuster can adjust right the direction of the field of view of the camera positioned closer to the right turn lane of the first camera and the second camera.

Alternatively, when the determiner determines that the current road is an intersection having a straight lane and a left turn lane, the adjuster can adjust left the direction of the field of view of the camera positioned closer to the left turn lane of the first camera and the second camera.

Alternatively, when the determiner determines that the current road is an intersection having a straight lane, a left turn lane, and a right turn lane, the adjuster can adjust left and right respectively the directions of the fields of view of the cameras positioned closer to the left turn lane and the right turn lane of the first camera and the second camera.

After the direction of the first field of view or the second field of view is adjusted, as described above, when the determiner determines that the current road is not an intersection, the adjuster can return the adjusted direction of the first field of view or the second field of view into the initial state.

In detail, before the vehicle passes an intersection, the determiner can determine that the current road on which the vehicle is running is an intersection and the adjuster can adjust the direction of the first field of view or the second field of view. Thereafter, when time passes and the vehicle passes intersection, the determiner determines that the current road on which the vehicle is running is not an intersection and the adjuster can return the adjusted direction of the first field of view or the second field of view into the initial state.

Similarly, when a predetermined time passes after the direction of the first field of view or the second field of view is adjusted, the adjuster can return the adjusted direction of the first field of view or the second field of view into the initial state. The passing time can be calculated on the basis of the average distance of intersections and the speed of the vehicle. Accordingly, a speed sensor for detecting the speed of the vehicle may be further included.

Alternatively, the passing time may be calculated on the basis of the number of lanes of the current road and the speed of the vehicle. Accordingly, a lane sensor for detecting the number of lanes of the current road and a speed sensor for detecting the speed of the vehicle may be further included.

In order for the adjuster to adjust the direction of the first field of view or the second field of view, as described above, it is possible to change the mechanical position of the first camera or the second camera included in the stereo camera or the position of the lens of the first camera or the lens of the second camera.

Meanwhile, the determiner 110 and the adjuster 120 etc. included in the driving assist system 100 according to the embodiment may be implemented as a partial module of an integrated controller or an ECU that is mounted on a vehicle.

The automotive integrated controller or ECU may include a processor, a storage device such as a memory, and computer programs that can perform specific functions, and the determiner 110 and the adjuster 120 etc. may be implemented as software modules that can perform their own functions.

The object sensor 130 included in the driving assist system 100 according to the embodiment may include, other than the stereo camera, other automotive sensors such as one or more radar sensors and ultrasonic sensors, and the alarm 140 may be implemented by one or more display devices or sound output devices and a control module for controlling these devices.

The forward monitoring system operating as described above in accordance with an embodiment has a wide detection area when the current road is an intersection, so it is possible to detect other vehicles approaching in a right turn lane or a left turn lane.

A driving assist method that is performed by the driving assist system described above with reference to FIGS. 1 to 12 will be briefly described hereafter.

Figure 13:
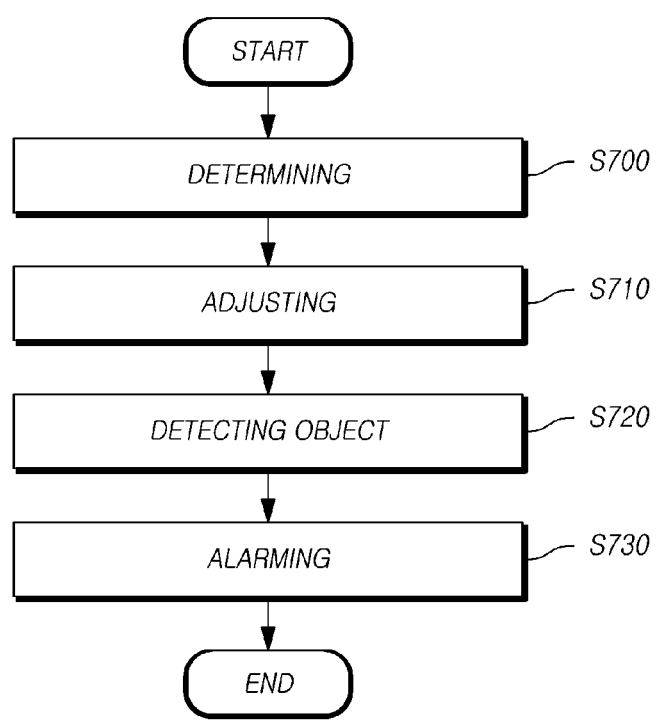
FIG. 13 is a flowchart illustrating a driving assist method according to an embodiment.

Referring to FIG. 13, the driving assist method according to an embodiment may include: determining whether the current road is an intersection on the basis of information obtained from a route guidance device or camera information obtained from a stereo camera that detects the front area of a vehicle (S700); adjusting the direction of a first field of view (FOV) or a second field of view such that the overlap area of the first field of view and the second field of view that are the fields of view of a first camera and a second camera included in the stereo camera is reduced, when the current road is determined as an intersection (S710); detecting an object in the front area by fusing radar information obtained from a radar for monitoring the front area of the vehicle and the camera information (S720); and alarming of giving notice that there is an object in the front area or giving a warning of a danger of a collision with the object in the front area (S730).

Accordingly, the determining S700 according to an embodiment can determine whether the current road is an intersection by detecting the characteristics of known intersections from the camera information obtained from the stereo camera. The characteristics of intersection may include at least one of a vehicle that is transversely running, a plurality of crosswalks, and a transverse lane.

When the current road is determined as an intersection, the adjusting S710 according to an embodiment can adjust the direction of a first field of view (FOV) or a second field of view such that the overlap area of the first field of view and the second field of view that are respectively the fields of view of the first camera and the second camera included in the stereo camera is reduced.

For example, when it the current road is determined as an intersection having a straight lane and a right turn lane in the determining S700, the adjusting S710 can adjust right the direction of the field of view of the camera positioned closer to the right turn lane of the first camera and the second camera.

Alternatively, when the current road is determined as an intersection having a straight lane and a left turn lane in the determining S700, the adjusting S710 can adjust left the field of view of the camera positioned closer to the left turn lane of the first camera and the second camera.

Alternatively, when the current road is determined as an intersection having a straight lane, a left turn lane, and a right turn lane in the determining S700, the adjusting S710 can adjust left and right respectively the directions of the fields of view of the cameras positioned closer to the left turn lane and the right turn lane of the first camera and the second camera.

After the direction of the first field of view or the second field of view is adjusted, as described above, when the current road is determined as not being an intersection in the determining S700, the adjusting S710 can return the adjusted direction of the first field of view or the second field of view into the initial state.

In detail, before the vehicle passes an intersection, the determining S700 can determine that the current road on which the vehicle is running is an intersection and the adjusting S710 can adjust the direction of the first field of view or the second field of view. Thereafter, when time passes and the vehicle passes intersection, the determining S700 determines that the current road on which the vehicle is running is not an intersection and the adjusting S710 can return the adjusted direction of the first field of view or the second field of view in the initial state.

Similarly, when a predetermined time passes after the direction of the first field of view or the second field of view is adjusted, the adjusting S710 can return the adjusted direction of the first field of view or the second field of view into the initial state. The passing time can be calculated on the basis of the average distance of intersections and the speed of the vehicle. Accordingly, detecting the speed of the vehicle may be further included. Alternatively, the passing time may be calculated on the basis of the number of lanes of the current road and the speed of the vehicle. Accordingly, detecting the number of lanes of the current road and detecting the speed of the vehicle may be further included.

In order for the adjusting S710 to adjust the direction of the first field of view or the second field of view, as described above, it is possible to change the mechanical position of the first camera or the second camera included in the stereo camera or the position of the lens of the first camera or the lens of the second camera.

The detecting of an object S720 according to an embodiment can detect an object in the front area by fusing camera information obtained from the stereo camera that is controlled in the adjusting S710 and radar information obtained from a radar for monitoring the front area of the vehicle.

The camera information is image information, but the radar information may be figure information. Accordingly, by fusing the camera information and the radar information that are different in essence, it is possible to accurately detect an object.

When an object in the front area is detected in the detecting of an object S720, the alarming S730 according to an embodiment can give notice of the object in the front area or give a warning of a danger of a collision with the object in the front area.

For example, the alarming S730 can visually provide notice to passengers using a lamp etc. In order to give notice of an object in the front area, the alarming S730 may provide light having low intensity by controlling a lamp or light slowly blinking by turning on/off a lamp. Alternatively, in order to give notice of a danger of a collision with an object in the front area, the alarming S730 may provide light having high intensity by controlling a lamp or light quickly blinking by turning on/off a lamp.

Alternatively, the alarming S730 may aurally give notice to passengers using a sound system. Accordingly, in order to give notice of an object in the front area, the alarming S730 may provide a small sound by controlling a sound system or a sound that is slowly repeated by turning on/off a sound system. On the other hand, in order to give notice of a danger of a collision with an object in the front area, the alarming S730 may provide a loud sound by controlling a sound system or a sound that is frequently repeated by turning on/off a sound system.

Alternatively, the alarming S730 may tactually give notice to passengers using a vibration system etc. Accordingly, in order to give notice of an object in the front area, the alarming S730 may provide small vibration using a vibration system or vibration that is not frequently repeated by turning on/off a vibration system. On the other hand, in order to give notice of a danger of a collision with an object in the front area, the alarming S730 may provide large vibration by controlling a vibration system or vibration that is frequently repeated by turning on/off a vibration system.

The driving assist method that is performed, as described above, in accordance with an embodiment monitors a wide area when the vehicle passes an intersection, whereby it can detect a vehicle approaching in a right turn lane or a left turn lane. Accordingly, common stereo cameras have fields of view of about 45 degrees, but the stereo camera used in the driving assist method according to an embodiment may have a field of view of over 45 degrees, depending on adjustment.

Accordingly, the driving assist method according to an embodiment lets the driver know that there is a vehicle approaching in a right turn lane or a left turn lane or gives a warning of a danger of a collision with the vehicle, whereby it is possible to prevent a possible collision accident with the vehicle.

Further, the driving assist method of the present disclosure can perform all the operations of the driving assist system of an embodiment described above with reference to FIGS. 1 to 12.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A driving assist system including a forward monitoring system, the driving assist system comprising:

a determiner configured to determine whether a current road is an intersection on the basis of camera information obtained from a stereo camera for monitoring the front area of a vehicle, the stereo camera comprising first and second cameras; and an adjuster configured to rotate an angle of a direction at least one of a first field of view (FOV) of the first camera or a second field of view of the second camera such that an overlap area between the first field of view of the first camera and the second field of view of the second camera is reduced, when the current road is determined as an intersection.

2. The driving assist system of claim 1, wherein the determiner determines that the current road is an intersection when a vehicle transversely running is detected from the camera information.

3. The driving assist system of claim 1, wherein the determiner determines that the current road is an intersection when a plurality of crosswalks is detected from the camera information.

4. The driving assist system of claim 1, wherein the determiner determines that the current road is an intersection when a transverse lane is detected from the camera information.

5. The driving assist system of claim 1, wherein the intersection is a road having a straight lane and a left turn lane, and
the adjuster adjusts left the direction of the field of view of the camera positioned closer to the left turn lane of the first camera and the second camera.

6. The driving assist system of claim 1, wherein the intersection is a road having a straight lane and a right turn lane, and
the adjuster adjusts right the direction of the field of view of the camera positioned closer to the right turn lane of the first camera and the second camera.

7. The driving assist system of claim 1, wherein the intersection is a road having a straight lane, a left turn lane, and a right turn lane, and
the adjuster adjusts left and right respectively the directions of the fields of view of the cameras positioned closer to the left turn lane and the right turn lane of the first camera and the second camera.

8. The driving assist system of claim 1, wherein the adjuster adjusts the direction of the first field of view or the second field of view, and then returns the adjusted direction of the first field of view and the second field of view into the initial state when the current road is determined as not being an intersection.

9. The driving assist system of claim 1, wherein the adjuster adjusts the direction of the first field of view or the second field of view, and then returns the adjusted direction of the first field of view and the second field of view into the initial state when a time for passing the intersection elapses.

10. The driving assist system of claim 9, further comprising:
a speed sensor configured to detect the speed of the vehicle; and
a lane sensor configured to detect the number of lanes of the current road on the basis of the camera information, and
the time for passing the intersection is calculated on the basis of the speed of the vehicle and the number of lanes.

11. The driving assist system of claim 1, further comprising:
an object sensor configured to detect an object in the front area by fusing radar information from a radar configured to monitor the front area of the vehicle and the camera information; and
an alarm configured to give notice that there is an object in the front area or give a warning of a danger of a collision with the object in the front area.

12. A driving assist method comprising:
determining whether a current road is an intersection on the basis of camera information obtained from a stereo camera for monitoring the front area of a vehicle, the stereo camera comprising first and second cameras; and
rotating an angle of a direction of a first field of view (FOV) of the first camera or a second field of view of the second camera such that an overlap area between the first field of view of the first camera and the second field of view of the second camera is reduced, when the current road is determined as an intersection.

13. The method of claim 12, further comprising:
detecting an object in the front area by fusing radar information from a radar configured to monitor the front area of the vehicle and the camera information; and
alarming of giving notice that there is an object in the front area or giving a warning of a danger of a collision with the object in the front area.

14. The method of claim 12, wherein the adjusting adjusts the direction of the first field of view or the second field of view, and then returns the direction of the first field of view and the second field of view into the initial state when the current road is determined as not being an intersection.

15. The method of claim 12, wherein the adjusting adjusts the direction of the first field of view or the second field of view, and then returns the adjusted direction of the first field of view and the second field of view into the initial state when a time for passing the intersection elapses.

16. The method of claim 15, further comprising;
detecting the speed of the vehicle; and
detecting the number of lanes of the current road on the basis of the camera information, and
the time for passing the intersection is calculated on the basis of the speed of the vehicle and the number of lanes.

17. The driving assist system of claim 1, wherein the first camera and the second camera are spaced apart from each other at a fixed predetermined distance.

18. The method of claim 12, wherein the first camera and the second camera are spaced apart from each other at a fixed predetermined distance.

* * * * *